United States Patent
Waltner (10) Patent No.: US 10,040,566 B2
(45) Date of Patent: Aug. 7, 2018

(54) HYBRID CONTINGENCY POWER DRIVE SYSTEM

(71) Applicant: SIKORSKY AIRCRAFT CORPORATION, Stratford, CT (US)

(72) Inventor: Peter James Waltner, Royal Palm Beach, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/328,616

(22) PCT Filed: Sep. 22, 2015

(86) PCT No.: PCT/US2015/051454
§ 371 (c)(1),
(2) Date: Jan. 24, 2017

(87) PCT Pub. No.: WO2016/049030
PCT Pub. Date: Mar. 31, 2016

(65) Prior Publication Data
US 2017/0225794 A1 Aug. 10, 2017

Related U.S. Application Data

(60) Provisional application No. 62/054,077, filed on Sep. 23, 2014.

(51) Int. Cl.
*B64D 31/06* (2006.01)
*B64D 27/24* (2006.01)
(Continued)

(52) U.S. Cl.
CPC ............... *B64D 31/06* (2013.01); *B60K 6/20* (2013.01); *B60L 11/14* (2013.01); *B60L 11/16* (2013.01);
(Continued)

(58) Field of Classification Search
None
See application file for complete search history.

(56) References Cited

U.S. PATENT DOCUMENTS 3,455,182 A * 7/1969 Kelley .................... B64C 27/12
244/17.11
5,899,941 A 5/1999 Nishijima et al.
(Continued)

OTHER PUBLICATIONS

Written Opinion of the International Searching Authority for International Application No. PCT/US2015/051454 dated Nov. 13, 2015; dated Dec. 28, 2015; 12 pages.
(Continued)

*Primary Examiner* — Dirk Wright
(74) *Attorney, Agent, or Firm* — Cantor Colburn LLP (57) ABSTRACT

A hybrid power drive system for an aircraft comprises a rotor that receives power and a first power drive sub-system including at least one engine in connection with the rotor is configured to provide a first power to the rotor. Further, the hybrid power drive system also includes a second power drive sub-system connected in parallel to the first power drive sub-system. The second power drive sub-system is configured to provide a second power to the rotor a second power drive sub-system connected in parallel to the first power drive sub-system and configured to provide a second power to the rotor when the first power provided by the first power drive sub-system is less than a power demand of the rotor.

14 Claims, 4 Drawing Sheets

(51) Int. Cl.
*B64D 35/08* (2006.01)
*B60K 6/20* (2007.10)
*F01D 13/00* (2006.01)
*F01D 15/12* (2006.01)
*B60L 11/14* (2006.01)
*B60L 11/16* (2006.01)
*B60L 11/18* (2006.01)
*B64D 27/02* (2006.01)

(52) U.S. Cl.
CPC .............. *B60L 11/18* (2013.01); *B64D 27/24* (2013.01); *B64D 35/08* (2013.01); *F01D 13/00* (2013.01); *F01D 15/12* (2013.01); *B60L 2200/10* (2013.01); *B64D 2027/026* (2013.01); *F05D 2220/329* (2013.01); *F05D 2260/43* (2013.01); *F05D 2270/09* (2013.01)

(56) References Cited

U.S. PATENT DOCUMENTS

| | | | |
|---|---|---|---|
| 6,344,700 B1 | 2/2002 | Eisenhauer et al. | |
| 8,283,796 B2 | 10/2012 | Certain | |
| 8,464,980 B2* | 6/2013 | Certain | B64D 35/04 244/17.11 |
| 8,543,262 B1 | 9/2013 | Gehrke et al. | |
| 8,727,271 B2* | 5/2014 | Salyer | B64C 27/04 244/17.11 |
| 8,757,542 B2* | 6/2014 | Hopdjanian | B60L 3/0046 244/53 R |
| 9,102,326 B2* | 8/2015 | Anderson | B64D 27/24 |
| 9,156,562 B2* | 10/2015 | Buono | B64C 27/10 |
| 9,180,964 B2* | 11/2015 | Smith | B64C 27/006 |
| 9,193,451 B2* | 11/2015 | Salyer | B64C 37/00 |
| 9,586,690 B2* | 3/2017 | Rajashekara | B64C 11/305 |
| 9,708,074 B2* | 7/2017 | Jaenker | B64D 35/02 |
| 2009/0145998 A1 | 6/2009 | Salyer et al. | |
| 2010/0065677 A1 | 3/2010 | Ferrier | |
| 2011/0108663 A1* | 5/2011 | Westenberger | B64D 27/02 244/60 |
| 2014/0034781 A1 | 2/2014 | Kouros et al. | |
| 2014/0054411 A1 | 2/2014 | Connaulte et al. | |
| 2015/0151844 A1* | 6/2015 | Anton | B64C 31/024 244/55 |

OTHER PUBLICATIONS

International Preliminary Report on Patentability for International Appln. No. PCT/US2015/051454; International Filing Date: Sep. 22, 2015; dated Mar. 28, 2017 6 pages.
Notification of Transmittal of the International Search Report for International Application No. PCT/US2015/051454 dated Nov. 13, 2015; dated Dec. 28, 2015; 12 pages.
Wikipedia, [online]; [retrieved on Mar. 5, 2018]; retrieved from the Internet https://en.wikipedia.org/wiki/Hybrid_vehicle_drivetrain
Wikipedia, "Hybrid Vehicle Drivetrain," Wikipedia, Feb. 26, 2018, pp. 1-12.

* cited by examiner

HYBRID CONTINGENCY POWER DRIVE SYSTEM

CROSS REFERENCE TO RELATED APPLICATIONS

This application is a National Stage application of PCT/US2015/051454, filed Sep. 22, 2015, which claims the benefit of U.S. Provisional Application No. 62/054,077, filed Sep. 23, 2014, both of which are incorporated by reference in their entirety herein.

FIELD OF THE INVENTION

The subject matter disclosed herein relates generally to the field of propulsion systems, and to a rotary wing aircraft having an electric hybrid contingency power drive system.

BACKGROUND OF THE INVENTION

Rotary wing aircraft utilize propulsion systems to power aircraft flight. These propulsion systems convert stored energy into mechanical work to drive one or more rotor systems for flight. Energy (typically stored in chemical form as fuel) is supplied to an energy conversion device (typically a plurality of internal combustion engines such as a turbine engine, spark ignition engine, or compression ignition engine), which converts the energy into mechanical work. A drive system transmits mechanical work through a plurality of transmission mechanisms (e.g., main rotor gearbox(es), a tail rotor gearbox, intermediate gearbox(es), drive shafts, drive couplings, etc.) to drive the rotary wing aircraft's thrust generating rotors.

In an emergency, e.g., in the event of an engine failure of a multi-engine aircraft, the aircraft must rely on contingency power from the remaining operating engine(s) for a predetermined duration so as to place the aircraft in a safe flight regime and react to the engine failure. Emergency power for an example turbine engine is typically defined as One Engine Inoperative ("OEI") ratings with varying limits and durations. When operating to OEI limits, the turbine engine is run at increased speeds and/or temperatures during an emergency for typical durations of 30 seconds to 2.5 minutes in order to provide a limited duration increased power to achieve a safe flight condition. However, increases to these time limited emergency power ratings is difficult, expensive, and may not be possible over the entire envelope without significant engine redesign.

BRIEF SUMMARY OF THE INVENTION

In accordance with an aspect of the invention, a hybrid power drive system for an aircraft comprises a rotor; a first power drive sub-system including at least one engine in connection with the rotor and configured to provide a first power to the rotor; and a second power drive sub-system connected in parallel to the first power drive sub-system and configured to provide a second power to the rotor when the first power provided by the first power drive sub-system is less than a power demand of the rotor.

In accordance with another aspect of the invention, a method for controlling a hybrid power drive system of an aircraft that comprises receiving a signal indicative of a power demand on a rotor; connecting in parallel a first power drive sub-system and a second power drive sub-system; and causing the supply of second power from the second power drive sub-system to the first power drive sub-system to provide power to the rotor when the first power provided by the first power drive sub-system is less than the power demand of the rotor.

Technical function of the one or more claims described above provides an aircraft system for delivering contingency power through a hybrid contingency power drive system such that a pilot may establish a safe flight condition subsequent to an engine failure or other emergency condition while minimizing impact on overall fuel economy and system cost.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION OF THE INVENTION

Figure 1:
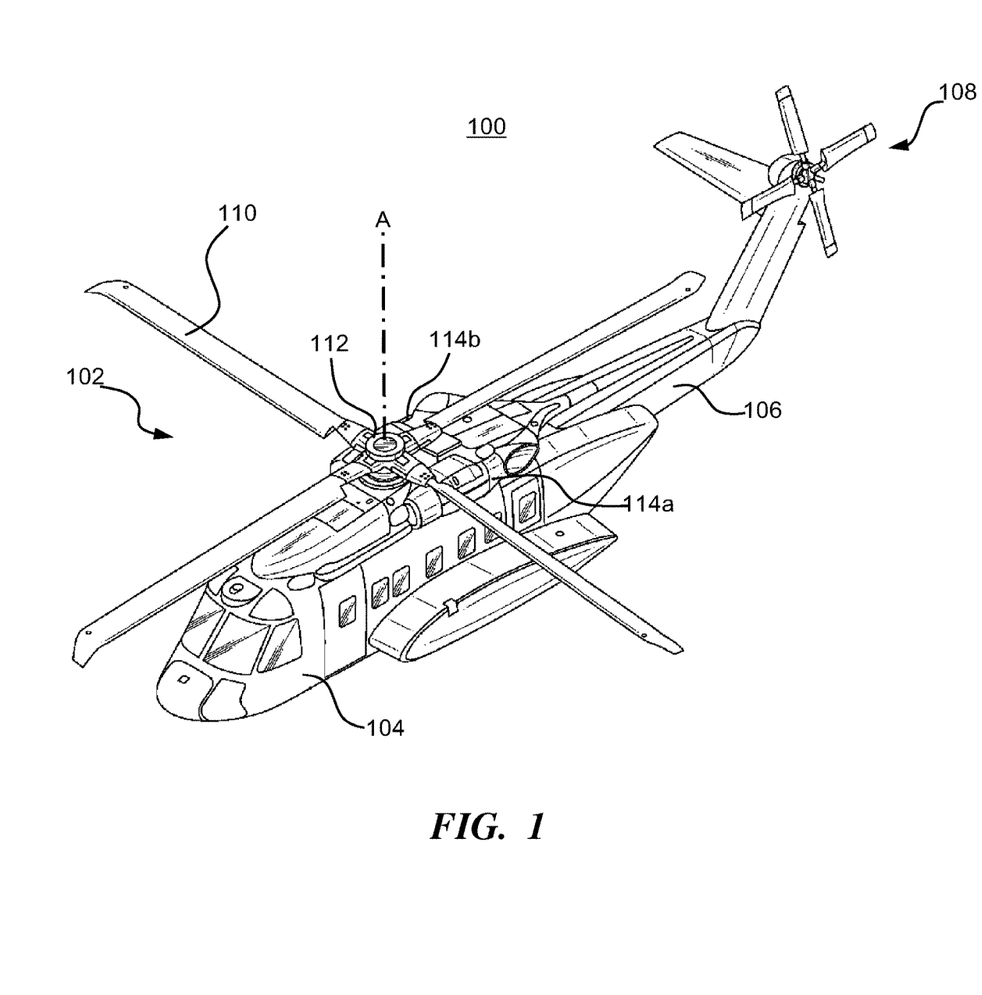
FIG. 1 depicts an exemplary rotary wing aircraft in accordance with an embodiment of the invention.

A hybrid contingency power drive system that provides contingency power subsequent to an engine failure that minimizes impact on overall fuel economy or system cost is desired FIG. 1 schematically illustrates a helicopter or rotary wing aircraft 100 which includes a hybrid contingency power drive system (shown in FIGS. 2-4) that provides contingency power in accordance with an embodiment of the invention. Hybrid contingency power drive system includes a main drive system in serial or in parallel with an auxiliary drive system. The auxiliary drive system provides a limited duration boost of power to the rotors of aircraft 100 in order to achieve a safe-flight condition as well as increased power capability for single-engine and multi-engine aircraft, e.g., the aircraft 100. The hybrid contingency power drive system is described below in relation to FIGS. 2-4.

As shown in FIG. 1, the aircraft 100 includes an airframe 104 having a main rotor assembly 102 and an extending tail 106 which mounts a tail rotor system 108, such as an anti-torque system, a translational thrust system, a pusher propeller, a rotor propulsion system, and the like. The main rotor assembly 102 includes a plurality of rotor blades 110 mounted to a rotor hub 112. The main rotor assembly 102 is driven about an axis of rotation A through a main rotor gearbox (not shown) by a multi-engine power plant system, here shown as two engines 114a and 114b. In an alternative embodiment, the hybrid contingency power drive system (shown in FIGS. 2-4) may also be used on a single engine power plant system. The engines 114a and 114b generate the power available to the aircraft 100 for driving a transmission system that is connected to the main rotor assembly 102 and the tail rotor system 108 as well as for driving various other rotating components to thereby supply electrical power for flight operations. Examples of the engines 114a and 114b may include any internal combustion engine, turbine engine, spark ignition engine, compression ignition engine, etc. Further, the engines 114a and 114b (along with other engines described below) may also include a diesel to electric engine system, a fuel cell system, etc., and thus the engines 114a and 114b should not be construed to any particular engine type.

In embodiments, the aircraft 100 may utilize a plurality of approaches for providing contingency power to a rotor of the aircraft 100 for a limited duration to achieve a safe flight condition during an emergency condition, e.g., during an engine failure, drooped rotor state, and/or for increased power during unsafe flight conditions. The approaches may be utilized through an electric motor (shown in FIGS. 2-4) that receives electricity from one or more electric power sources onboard the aircraft 100 and provide contingency power to the main rotor assembly 102 and the tail rotor system 108 so as to achieve a safe flight condition. Although a particular helicopter configuration is illustrated and described in the disclosed embodiments, other configurations and/or machines with single engine or multi-engine power plants, such as high speed compound rotary wing aircraft with supplemental translational thrust systems, dual contra-rotating, coaxial rotor system aircraft, tilt-rotors and tilt-wing aircraft, and fixed wing aircraft, will also benefit from embodiments of the invention.

Figure 2:
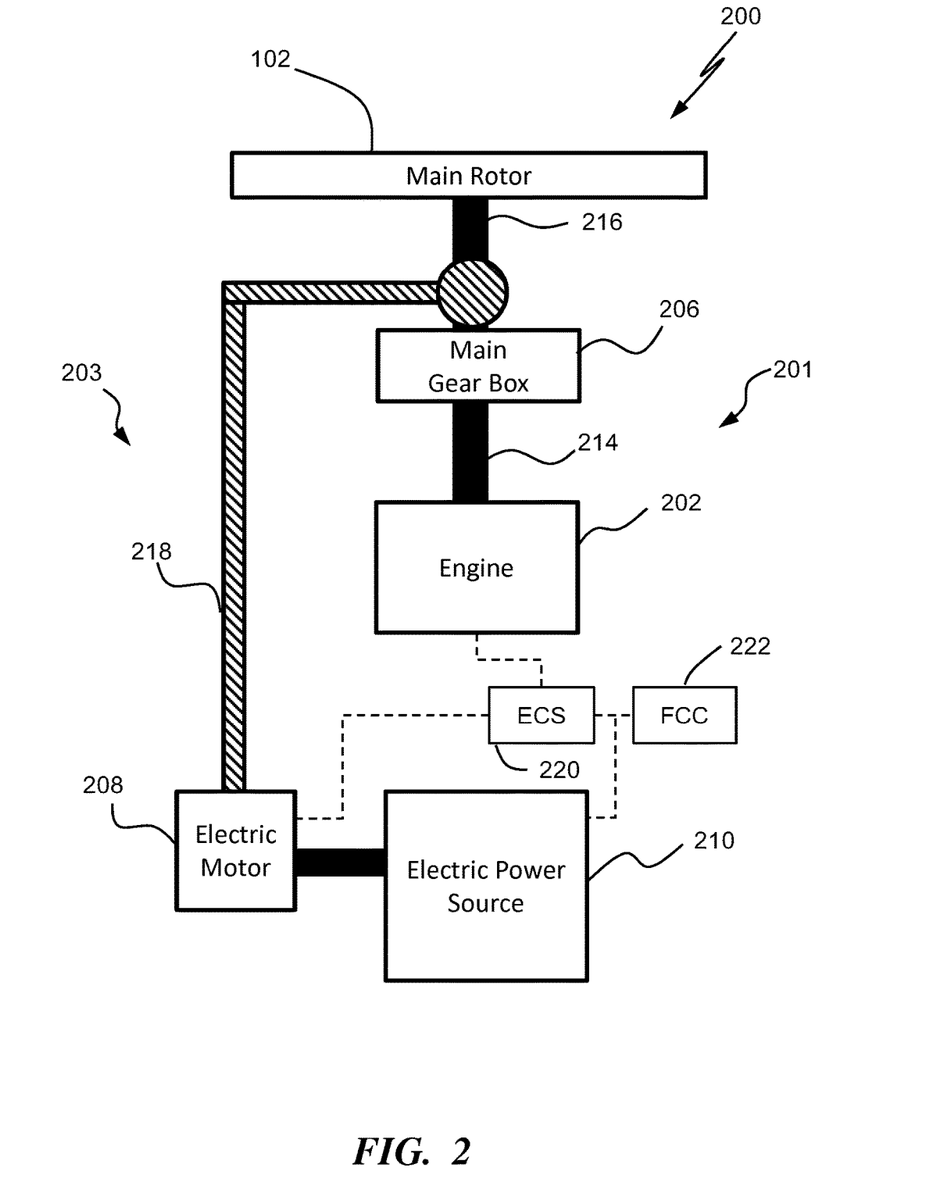
FIG. 2 depicts a hybrid power drive system for a rotary wing aircraft in accordance with an embodiment of the invention.

FIG. 2 depicts a schematic view of a hybrid contingency power drive system 200 (hereinafter "hybrid system 200") for the aircraft 100 (FIG. 1) in accordance with an embodiment of the invention. The hybrid system 200 includes an engine 202 of a single-engine power plant (although the hybrid system 200 could be implemented with the multi-engine 114a-114b power plant, as shown in FIG. 1), a main gearbox 206, an electric motor 208, and an electric power source 210. Many of the ancillary systems that may be coupled to the engine 202 such as an engine controller, e.g., an engine control system ("ECS") 220. Other examples of ancillary systems include fuel systems, pumps, etc., which are not shown in FIG. 2 for ease of description of embodiments of the invention.

As illustrated in FIG. 2, the hybrid system 200 is depicted with a main drive system 201 in parallel with an auxiliary drive system 203 (e.g., a first power drive system in parallel with a second power drive system). The main drive system 201 includes an engine 202, the main gearbox 206, an engine power shaft 214, and a main rotor shaft 216. The engine 202 is mechanically connected to the engine power shaft 214 to extract energy from fuel and rotate the engine power shaft 214. The engine power shaft 214 provides the motive force to drive the main rotor assembly 102, via the main rotor shaft 216, in addition to driving the tail rotor system 108 (FIG. 1). The main rotor assembly 102 is driven about an axis of rotation through the main gearbox 206 by the engine 202. The auxiliary drive system 203 includes the electric power source 210 and the electric motor 208 that are connected to the main drive system 201 through a motor output shaft 218. The electric power source 210 provides energy to the electric motor 208. The motor output shaft 218 mechanically connects the electric motor 208 to the main rotor shaft 216. Note that the electric motor 208 and the motor output shaft 218 may be installed, e.g., about axis A (FIG. 1) with the main rotor shaft 216. Further, in this embodiment, the motor output shaft 218 could be characterized as a ring instead of a shaft and may be substantially integrated with the main rotor shaft. Alternatives to installing the electric motor 208 coaxially with the main rotor shaft 218 include, e.g., belt drive, gears, an array of small electric motors, etc. One or more electric power sources (210), e.g., battery bank, ultra-capacitors, flywheel energy storage systems, or the like, supply energy to the electric motor 208 for rotationally driving the motor output shaft 218. The one or more electric power sources 210 are rechargeable and may either be charged with energy on the ground with an external power source or in-flight with aircraft power. In operation, during an emergency condition, the auxiliary drive system 203 is used to provide a short boost of power to achieve a safe-flight condition, such as when the engine 202 fails or the aircraft 100 is in an unsafe condition and power plant 202 cannot supply sufficient power to navigate away from the unsafe condition. In these cases, the electric motor 208 may be used to provide contingency power to achieve a safe flight condition during the emergency condition. In the emergency condition, the electric motor 208 receives electric power from the electric power source 210 and rotationally drives the main rotor shaft 216 via the motor output shaft 218 and thereby, provides contingency power in a similar manner as an OEI 30 second power rating provides.

Also, the hybrid system 200 includes the controller 220 that is in communication with an engine 202 and the electric motor 208, such as a Full Authority Digital Engine Controllers (FADEC). In an embodiment, the controller 220 receives commands representing a power demand on an engine and selectively connects the electric motor 208 to the main drive system 201 during an emergency condition of the engine 202 (Note that, in general, while the electric motor is always 'connected,' a free-wheel clutch system or idling mode would draw minimal power so that the selective control of electricity flowing into the motor is possible by the speed controller). In an embodiment, the controller 320 receives commands to selectively connect the electric motor 308 to the main drive system 301 during other power-related emergencies (e.g., an 'all engines operating drooped rotor state'), or in a normal operation that requires a short duration increase in power. The manner in which the controller 220 operates to control the engine 202 and the electric motor 208 during normal operation and/or during contingency power may vary according to system design approaches and at a design speed. The engine controller 220 provides command signals to the engine 202 and the electric motor 208 according to control logic. These commands may come from a pilot or from a flight control computer ("FCC") 222 automation. The controller 220 may include memory to store instructions that are executed by a processor. The executable instructions may be stored or organized in any manner and at any level of abstraction, such as in connection with controlling the hybrid system 200. The processor may be any type of central processing unit ("CPU"), including a general purpose processor, a digital signal processor, a microcontroller, an application specific integrated circuit ("ASIC"), a field programmable gate array ("FPGA"), or the like. Also, in embodiments, the memory may include random access memory ("RAM"), read only memory ("ROM"), or other electronic, optical, magnetic, or any other computer readable medium onto which is stored the data and control algorithms for controlling the engines 202, the electric motor 208, and other operational data for the aircraft 100 (FIG. 1).

Figure 3:
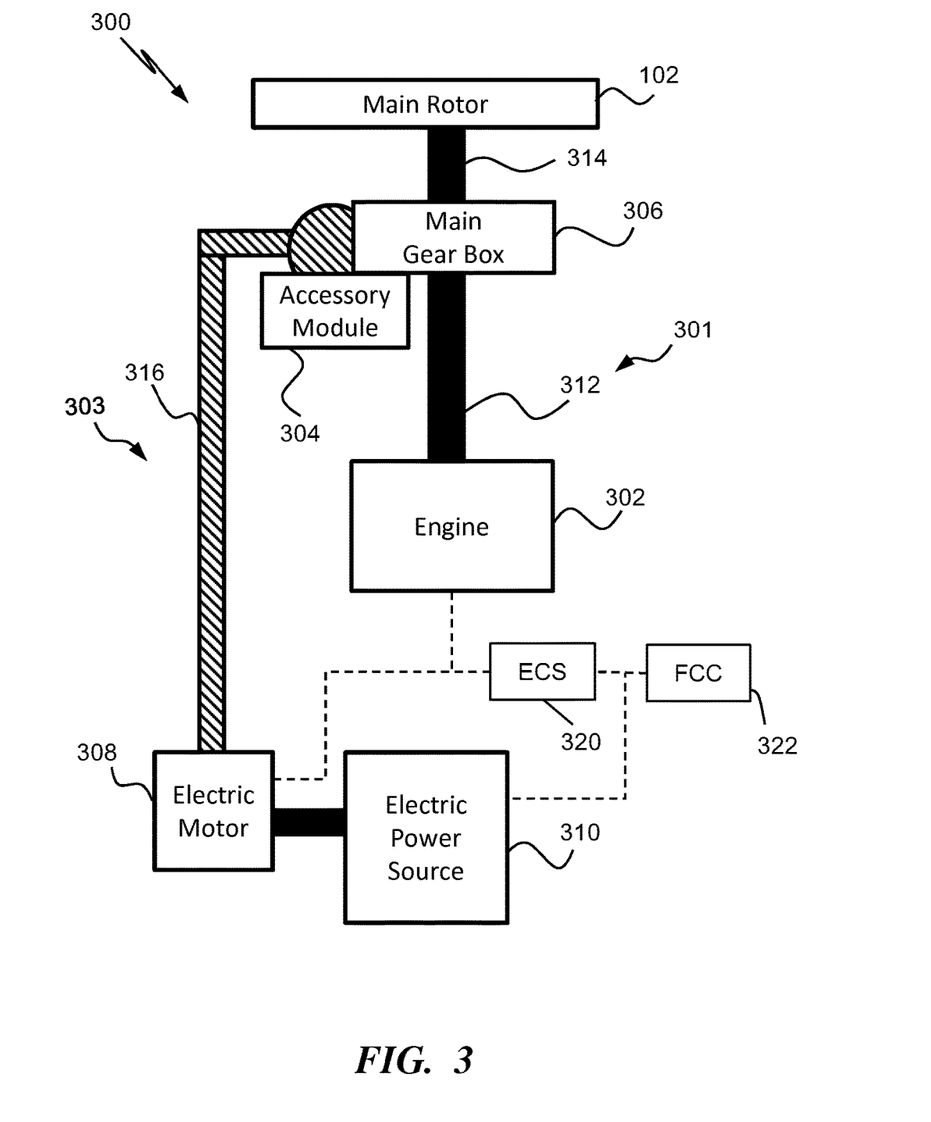
FIG. 3 depicts a hybrid power drive system for a rotary wing aircraft in accordance with an alternate embodiment of the invention.

FIG. 3 illustrates a schematic view of a hybrid contingency power drive system 300 (hereinafter "hybrid system 300") for the aircraft 100 (FIG. 1) in accordance with an alternate embodiment of the invention. The hybrid system 300 is substantially similar to the hybrid system 200 of FIG. 2, however, includes an accessory module 304 coupled to a main gearbox 306. The hybrid system 300 is depicted with an engine 302 of a single-engine power plant (although the hybrid system 300 could be implemented with the multi-engine 114a-114b power plants as shown in FIG. 1), the accessory module 304, the main gearbox 306, an electric motor 308, and an electric power source 310. Many of the ancillary systems may be coupled to the engine 302, such as an engine controller (e.g., an engine control system ("ECS") 320), fuel system, pumps, etc. or the like, which are not shown in FIG. 3 for ease of description of embodiments of the invention.

As illustrated in FIG. 3, the hybrid system 300 is depicted with a main drive system 301 in parallel with an auxiliary drive system 303 (e.g., another embodiment of a first power drive system in parallel with a second power drive system). The main drive system 301 includes the engine 302 that is mechanically connected to an engine power shaft 312 in order to extract energy from fuel and rotate the engine power shaft 312. The engine power shaft 312 provides the motive force to drive the main rotor assembly 102, via a main rotor shaft 314 in addition to driving the tail rotor system 108 (FIG. 1). The main rotor assembly 102 is driven about an axis of rotation through the main gearbox 306.

The accessory module 304, e.g., an auxiliary gearbox is mechanically coupled to the main gearbox 306 and receives the mechanical energy from the engine power shaft 312 through the main gearbox 306 to drive accessories like hydraulic pumps, fuel systems, combustors, electrical generators, and other accessories. In an embodiment, the accessory module 304 includes an electric generator that also operates as the electric motor 308 to back-drive the main gearbox 306 during the emergency condition.

The auxiliary drive system 303 includes the electric power source 310 and the electric motor 308 that are connected to the main drive system 301 through a motor output shaft 316. In an embodiment, the motor output shaft 316 mechanically connects the electric motor 308 to the main gearbox 306 through an electric transmission. One or more electric power sources (310), e.g., battery bank, ultra-capacitors, or flywheel energy storage system, or the like, supply energy to the electric motor 308 to rotate the motor output shaft 316, which in turn drives the main gearbox 306 and transmits power from the motor output shaft 316 to the main rotor shaft 314. The one or more electric power sources (310), e.g., battery bank, ultra-capacitors, flywheel energy storage systems, or the like, supply energy to the electric motor 308 for rotationally driving the motor output shaft 316, which in turn drives the main gearbox 306 either directly, through the accessory module 304, or other power transmission mechanisms. The one or more electric power sources 310 are rechargeable and may either be charged with energy on the ground with an external power source or in-flight with aircraft power. In operation, during an emergency condition, such as when the engine 302 fails or the aircraft 100 is in an unsafe condition and power plant (e.g., the engine 302) cannot supply sufficient power to navigate away from the unsafe condition, the electric motor 308 may be used to provide contingency power to achieve a safe flight condition during the emergency condition. In the emergency condition, the electric motor 308 receives electric power from the electric power source 310 and rotationally drives the main rotor shaft 314 via the main gearbox 306 and thereby, provides contingency power in a similar manner as an OEI 30 second power rating provides.

Also, the hybrid system 300 includes the controller 320 that is in communication with the engine 302 and the electric motor 308, such as a Full Authority Digital Engine Controllers (FADEC). In an embodiment, the controller 320 receives commands representing a power demand on an engine and selectively connects the electric motor 308 to the main drive system 301 during either an emergency condition of the engine 302 (Again note that, in general, while the electric motor is always 'connected,' a free-wheel clutch system or idling mode would draw minimal power so that the selective control of electricity flowing into the motor is possible by the speed controller). In an embodiment, the controller 320 receives commands to selectively connect the electric motor 308 to the main drive system 301 during other power-related emergencies (e.g., an 'all engines operating drooped rotor state'), or in a normal operation that requires a short duration increase in power. The manner in which the controller 320 operates to control the engine 302 and the electric motor 308 during normal operation and/or during contingency power may vary according to system design approaches and at a design speed. The engine controller 320 provides command signals to the engine 302 and the electric motor 308 according to control logic. These commands may come from a pilot or from FCC 322 automation. The controller 320 may include memory to store instructions that are executed by a processor. The executable instructions may be stored or organized in any manner and at any level of abstraction, such as in connection with controlling the hybrid system 300. The processor may be any type of central processing unit ("CPU"), including a general purpose processor, a digital signal processor, a microcontroller, an application specific integrated circuit ("ASIC"), a field programmable gate array ("FPGA"), or the like. Also, in embodiments, the memory may include random access memory ("RAM"), read only memory ("ROM"), or other electronic, optical, magnetic, or any other computer readable medium onto which is stored the data and control algorithms for controlling the engines 302, the electric motor 308, and other operational data for the aircraft 100 (FIG. 1).

Figure 4:
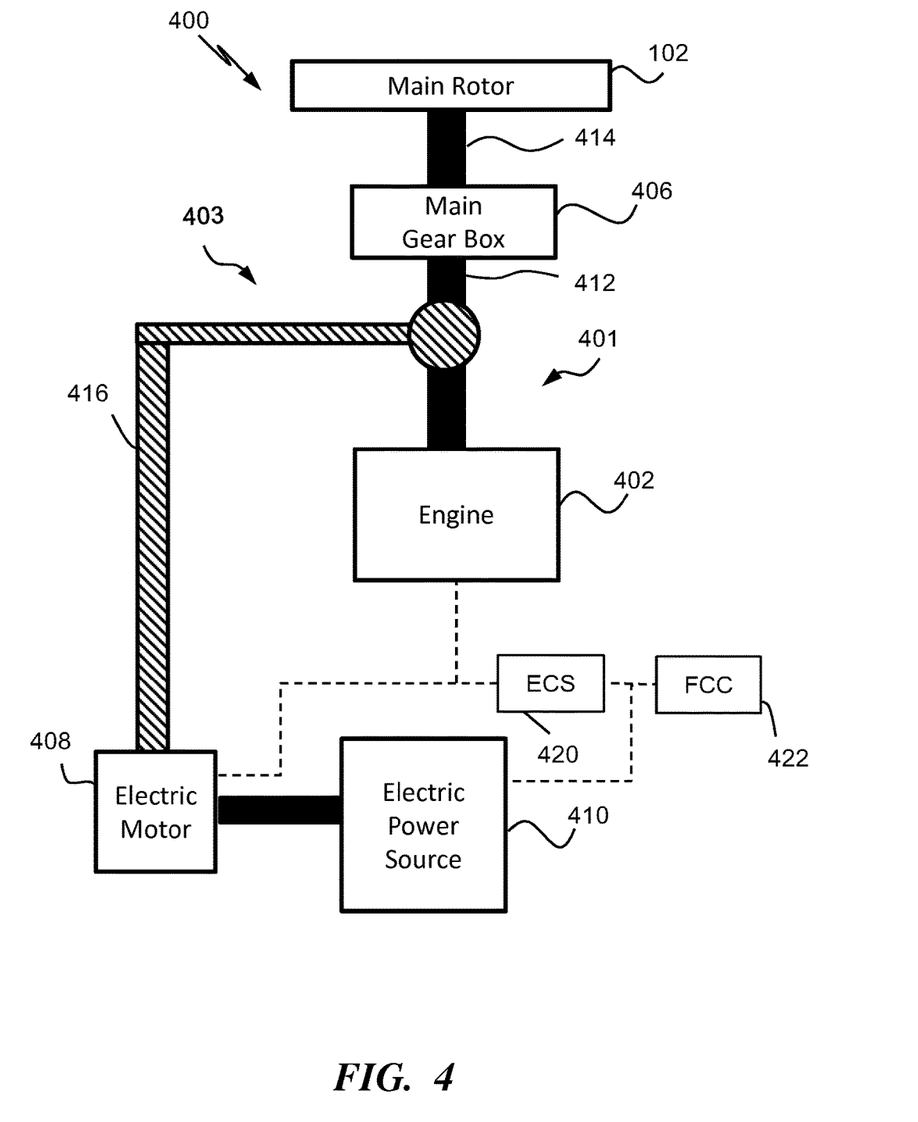
FIG. 4 depicts a hybrid power drive system for a rotary wing aircraft in accordance with an alternate embodiment of the invention.

FIG. 4 depicts a schematic view of a hybrid contingency power drive system 400 (hereinafter "hybrid system 400") for the aircraft 100 (FIG. 1) in accordance with an embodiment of the invention. The hybrid system 400 is substantially similar to the hybrid system 200 of FIG. 2, however, an auxiliary drive system 403 inserts power into the drivetrain at an engine power shaft 412 of a main drive system 401. While the mechanical connection depicted in FIG. 4 shows this connection between the engine and the gearbox, in an embodiment, this mechanical connection to the engine power shaft is on the opposite end of the engine than that depicted in FIG. 4. The hybrid system 400 is depicted with an engine 402 of a single-engine power plant (although the hybrid system 400 could be implemented with the multi-engine 114a-114b power plants as shown in FIG. 1), a main gearbox 406, an electric motor 408, and an electric power source 410. Many of the ancillary systems that may be coupled to the engine 402 such as an engine controller, e.g., an engine control system ("ECS") 420. Other examples of ancillary systems include fuel systems, pumps, etc., which are not shown in FIG. 4 for ease of description of embodiments of the invention.

As illustrated in FIG. 4, the hybrid system 400 is depicted with the main drive system 401 in parallel with the auxiliary drive system 403 (e.g., another embodiment of a first power drive system in parallel with a second power drive system). The main drive system 401 includes the engine 402 that is mechanically connected to the engine power shaft 412 in order to extract energy from fuel and rotate the engine power shaft 412. The engine power shaft 412 provides the motive force to drive the main rotor assembly 102, via a main rotor shaft 414 in addition to driving the tail rotor system 108 (FIG. 1), which is not pictured in FIG. 4. The main rotor assembly 102 is driven about an axis of rotation through the main gearbox 406 by the engine 402.

The auxiliary drive system 403 includes the electric power source 410 and the electric motor 408 that are connected to the main drive system 401 through a motor output shaft 416. The motor output shaft 416 mechanically connects the electric motor 408 to the engine power shaft 412. One or more electric power sources (410), e.g., battery bank, ultra-capacitors, flywheel energy storage systems, or the like, supply energy to the electric motor 408 for rotationally driving the motor output shaft 416, which in turn rotationally drives the engine power shaft 412. The electric power sources 410 are rechargeable and may either be charged with energy on the ground with an external power source or in-flight with aircraft power. In operation, during an emergency condition (e.g., the engine 402 fails or the aircraft 100 is in an unsafe condition and the engine 402 cannot supply sufficient power to navigate away from the unsafe condition), the electric motor 408 may be used to provide contingency power to achieve a safe flight condition during the emergency condition. In the emergency condition, the electric motor 408 receives electric power from the electric power source 410 and rotationally drives the engine power shaft 412 via the motor output shaft 416 and thereby, provides contingency power in a similar manner as an OEI 30 second power rating provides.

Also, the hybrid system 400 includes the controller 420 that is in communication with the engine 402 and the electric motor 408, such as a Full Authority Digital Engine Controllers (FADEC). In an embodiment, the controller 420 receives commands representing a power demand on an engine and selectively connects electric motor 408 to the main drive system 401 during an emergency condition of the engine 402. In an embodiment, the controller 420 receives commands to selectively connect the electric motor 408 to the main drive system 401 during other power-related emergencies (e.g., an 'all engines operating drooped rotor state'), or in a normal operation that requires a short duration increase in power. The manner in which controller 420 operates to control the engine 402 and the electric motor 408 during normal operation and/or during contingency power may vary according to system design approaches and at a design speed. The engine controller 420 provides command signals to the engine 402 and the electric motor 408 according to control logic. These commands may come from a pilot or from FCC 422 automation. The controller 420 may include memory to store instructions that are executed by a processor. The executable instructions may be stored or organized in any manner and at any level of abstraction, such as in connection with controlling the hybrid system 400. The processor may be any type of central processing unit ("CPU"), including a general purpose processor, a digital signal processor, a microcontroller, an application specific integrated circuit ("ASIC"), a field programmable gate array ("FPGA"), or the like. Also, in embodiments, the memory may include random access memory ("RAM"), read only memory ("ROM"), or other electronic, optical, magnetic, or any other computer readable medium onto which is stored the data and control algorithms for controlling the engines 402, the electric motor 408, and other operational data for the aircraft 100 (FIG. 1).

Benefits of embodiments described include providing a short duration boost of power to rotors of an aircraft during an emergency condition (e.g., during failure of one or more engines in a single-engine or multi-engine aircraft, or in any other unsafe flight condition where the power plant is not capable of providing sufficient power to achieve a safe-flight condition). For example, hybrid contingency power drive system may provide an immediate application of contingency power to an aircraft which may not be available during multiple engine operation or single-engine operation, or alternatively, to supplement OEI 30 second power from the turbine engines to get past an emergency condition.

It is noted that while the discussion above uses the example of contingency power being used to assist aircraft recovery in an emergency condition, this system may also be used to increase aircraft performance during certain normal operations. Some normal aircraft operations, such as takeoff, require increased power for a limited duration. As such, rotorcraft engines, e.g. 114*a* and 114*b* (FIG. 1), as well as 202 (FIG. 2), 302 (FIG. 3), and 402 (FIG. 4) typically provide a takeoff power rating which allows the engine to achieve increased powers for short durations. Further, it is noted that in many normal takeoff operations, the requirement for power above maximum continuous power available may be of short duration (e.g., less than 30 seconds for certain takeoff operations). Therefore, these contingency power systems shown in FIG. 2, FIG. 3, and FIG. 4 may alternately be used to increase normal operation power, and as such either increase aircraft capability for those normal operations that require short duration increases in power, or reduce the burden of the engine manufacturer to provide the aircraft with increased takeoff power ratings that reduce engine overhaul times. Thus, by incorporating these auxiliary power systems into the aircraft design, a total air-vehicle system may be optimize aircraft performance at a minimum cost.

Further, as a hybrid contingency power drive system is designed to provide auxiliary power to the main rotor 102 (FIG. 1) and tail rotor 108 (FIG. 1) when the engine is not capable of providing demanded power for relatively short durations, the hybrid contingency power drive system may also improve overall engine operability characteristics. It is noted that certain engines are slow to accelerate and provide full power under certain ambient conditions (altitudes, temperatures, speeds, etc.). For those conditions in which the engine does not provide desired power within the desired response time from initial signal to demand additional power, the controller 220 (FIG. 2), 320 (FIG. 3), or 420 (FIG. 4) may connect the auxiliary drive system 203 (FIG. 2), 303 (FIG. 3), or 403 (FIG. 4) to the main drive system 201 (FIG. 2), 301 (FIG. 3), or 401 (FIG. 4) to provide the demanded power within the desired elapsed time. As such, while the individual engine 202 (FIG. 2.), 302 (FIG. 3), or 402 (FIG. 4) may not be capable of producing power within the desired elapsed time from initial power demand, the total aircraft main drive system in conjunction with the auxiliary drive system may be designed to provide sufficient power within the desired elapsed time. Therefore, by incorporating these auxiliary power systems into the aircraft design, the normal operations of the aircraft may be enhanced through improved overall power delivery capability to the rotor.

Furthermore, as a hybrid contingency power drive system is designed to provide auxiliary power to the main rotor 102 (FIG. 1) and tail rotor 108 (FIG. 1) when the engine is not capable of providing demanded power for relatively short durations and hybrid electric systems inherently have the ability to produce large torques, the hybrid contingency power drive system may also improve rotor startup characteristics. It is noted that in high winds, safe start of the rotor 102 (FIG. 1) is enhanced by minimizing the time starting up and transitioning through low rotor speeds. Additionally, note that, as rotorcraft typically have high inertia rotor systems due to other design criteria, rotor start capability in high winds is sometimes limited. However, as the electric motor 208 (FIG. 2), 308 (FIG. 3), and 408 (FIG. 4) systems generally have relatively high torque and provide an auxiliary drive system to deliver power to the rotor 102 (FIG. 1), using the hybrid contingency power drive system to accelerate the rotor through the low rotor speeds quickly increases safety and enlarges the wind envelope within which it is safe to start the rotor 102 (FIG. 1).

Additionally, a benefit to this invention is that the electric power source (210, 310, and 410) required to provide flight power is relatively large when compared to normal electrical aircraft power sources. Therefore, it is contemplated that the electrical power sources (210, 310, and 410) may also supplement aircraft electrical power in the event of an electrical system emergency or surge power demands.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A hybrid power drive system for an aircraft, comprising:
   a rotor;
   a first power drive sub-system including at least one engine in connection with the rotor and configured to provide a first power to the rotor;
   a second power drive sub-system connected in parallel to the first power drive sub-system and configured to provide a second power to the rotor when the first power provided by the first power drive sub-system is less than a power demand of the rotor; and
   a controller operable to supply power from the second power drive sub-system to the first power drive sub-system to power to the rotor in response to a signal indicative of the power demand of the rotor.

2. The hybrid power drive system of claim 1, wherein the second power drive sub-system includes an electric motor in electric communication with an electric power source of the hybrid power drive system.

3. The hybrid power drive system of claim 1, wherein an electric motor is in mechanical communication with the first power drive sub-system at a rotor shaft.

4. The hybrid power drive system of claim 1, wherein an electric motor is in mechanical communication with the first power drive system at a first gearbox.

5. The hybrid power drive system of claim 1, wherein an electric motor is mechanical communication with the first power drive sub-system at an engine power shaft.

6. The hybrid power drive system of claim 1, wherein an electric power source comprises a rechargeable energy source selected from a list, wherein the list includes at least one of a battery, a capacitor, and a flywheel energy storage sub-system.

7. The hybrid power drive system of claim 1, further comprising a controller configured to receive a power demand signal indicative of the power demand.

8. The hybrid power drive system of claim 1, wherein the first power is a main power, the first power drive sub-system is a main power drive sub-system, the second power is a contingency power, and the second power drive sub-system is an auxiliary power drive sub-system.

9. The hybrid power drive system of claim 1, wherein the first power is less than the power demand of the rotor when the first power drive sub-system fails due to an emergency condition.

10. The hybrid power drive system of claim 1, wherein the emergency condition is a failure of the engine.

11. The hybrid power drive system of claim 1, wherein the first power is less than the power demand of the rotor when the engine increases the power demand in accordance with a drooped rotor state.

12. A method for controlling a hybrid power drive system of an aircraft, comprising:
   receiving a signal indicative of a power demand on a rotor;
   connecting in parallel a first power drive sub-system and a second power drive sub-system; and
   causing the supply of second power from the second power drive sub-system to the first power drive sub-system to provide power to the rotor when the first power provided by the first power drive sub-system is less than the power demand of the rotor
   wherein a controller in communication with a flight control computer causes the supply of second power from the second power drive sub-system to the first power drive sub-system to provide power to the rotor in response to receiving the signal indicative of the power demand on the rotor.

13. The method of claim 12, wherein the first power is a main power, the first power drive sub-system is a main power drive sub-system, the second power is a contingency power, and the second power drive sub-system is an auxiliary power drive sub-system.

14. The method of claim 12, wherein the receiving of the signal indicative of the power demand on the rotor is due to an emergency condition, and
   wherein the emergency condition is one of
   a failure of the engine and
   when the engine increases the power demand in accordance with a drooped rotor state.

* * * * *